United States Patent Office 3,204,009
Patented Aug. 31, 1965

3,204,009
PROCESS FOR THE ISOMERIZATION OF OLEFINS
Willis C. Keith, Lansing, Ill., assignor, by mesne assignments, to Sinclair Research, Inc., New York, N.Y., a corporation of Delaware
No Drawing. Filed Nov. 23, 1959, Ser. No. 854,563
10 Claims. (Cl. 260—683.2)

The invention relates to the isomerization of olefins, and more particularly to selective carbon to carbon double bond isomerization of olefins at elevated temperatures without substantial cracking or skeletal isomerization. As a specific embodiment, the present invention includes a process for the selective isomerization of certain isoamylenes to produce 3-methylbutene-1.

A large variety of catalysts is available to the art for isomerizing a straight chain to a branched chain hydrocarbon. Likewise, a large variety of catalysts is known for effecting a shift in the double bond in an olefin. A catalyst, however, which promotes the selective shifting of a bond in an olefin at relatively high temperature without undue cracking or skeletal isomerization is unique.

Cracking and skeletal isomerization although advantageous in certain isomerization procedures are disadvantageous in an isomerization process designed to produce commercially practical yields of a particular olefin. To illustrate, interest has been currently expressed in 3-methylbutene-1, presumably since it is polymerizes in the presence of the Ziegler type catalyst to form one of the highest melting (about 300° C.) hydrocarbon polymers known to date. See, for example, F. P. Reding, Journal of Polymer Science, 21, 547 (1956). In addition to recovery from natural sources various methods for the synthesis of 3-methyl-1-butene are known. However, isomerization of available isoamylenes to produce this olefin has heretofore proved unfavorable in that conventional isomerization catalysts tend either to produce considerable side reactions such as cracking and skeletal isomerization, particularly at the higher temperatures required to obtain a satisfactory amount of the desired olefin, or lack sufficient activity to produce commercially feasible yields. Consequently, the prior art isomerization processes have been marked by low selectivity and very limited yield of the desired olefin.

It has now been discovered that monoolefins, normal or branched chained, can be isomerized in the presence of certain anionic catalysts to obtain selectively a desired olefin product while avoiding the formation of undue amounts of other undesirable reaction products by virtue of cracking and skeletal isomerization. In accordance with the present invention the olefinic material to be isomerized is contacted under isomerization conditions with a catalyst prepared by calcining a composition of alumina and about 0.4 to 8 milliequivalents, preferably about 1 to 7.6 milliequivalents, per gram of said alumina of a compound selected from the group consisting of alkaline metal, i.e. alkali metal and alkaline earth metal, oxides and alkaline metal compounds that decompose upon calcination.

The isomerization process of the present invention is conducted under elevated temperatures, for instance, about 200 to 1100° F. The particular temperatures employed will depend upon the activity of the catalyst selected. Generally, for more advantageous results, use of the following temperatures is preferred when the active metal component of the catalyst of the present invention is as follows:

| | Temperature |
|---|---|
| K | 600–1000 |
| Cs | 200–900 |
| Rb | 200–900 |
| Na | 600+ |
| Li | 600+ |
| Alkaline earth metals | 600+ |

The olefin partial pressure employed is generally about 12 to 300 p.s.i.a. or more, preferably about 15 to 50, and the total pressure permits a vapor phase reaction. Is is emphasized that the olefin partial pressure is advantageously at least about 12 pounds absolute. If desired, free hydrogen under pressure can be used to keep down coke fouling of the catalyst. Under these circumstances, a hydrogen partial pressure of 300 pounds or more, with a preferred maximum of about 500 pounds, can be used, and will thereby prolong the life of the catalyst. The contact time or weight hourly space velocity employed in the present invention can vary widely depending on the particular catalyst selected. With the more active catalysts, for instance, a weight hourly space velocity of up to about 200 WHSV (weight of hydrocarbon per weight of catalyst per hour) or even more may be employed. Although the isomerization reaction of the present invention can be conducted in the presence of an inert diluent such as nitrogen or methane, use of diluents is not generally necessary. Also, the presence of substantial amounts of dienes such as isoprene have been found harmful to the reaction system.

The preferred olefin feed for the present invention are olefins that are branched or straight chain, containing from four to eight carbon atoms. Satisfactory results can also be obtained with higher molecular weight olefins such as normally liquid aliphatic olefins of up to 20 carbon atoms or more. Particularly suitable olefin feeds for the present invention are the isoamylenes, 2-methylbutene-1 and 2-methylbutene-2, which yield 3-methylbutene-1. If desired, a feed can be made of any ratio of these olefins that might be available. Substantially pure olefins are preferred, of course, but low molecular weight normal or branched chain alkanes have not been found to be detrimental. Contaminants which should be avoided in the feedstock are any type of acidic substances or potential acid forming compounds.

The anionic catalysts of the instant invention can be prepared, for instance, by impregnating or providing an alumina with alkali metal or alkaline earth metal compounds that decompose during calcination or by forming a composition of alumina and an alkali metal oxide or alkaline earth metal oxide, and then calcining the resulting composition. Suitable impregnating alkali or alkaline earth metal compounds that decompose during calcination to give a basic catalyst and most likely the corresponding metal aluminate after intermediate oxide formation, include, for instance, carbonates, bicarbonates, hydroxides, alcoholates, chelates and salts of other weak acids or salts of strong acids that decompose upon calcination such as the nitrates. Calcination temperatures are those known in the art, for example about 600 to 1300° F. or more and the alkaline metal is in the oxide or decomposable form at the time of calcination. The catalysts can be regenerated through removing carbonaceous materials deposited during isomerization, by contact with an oxygen-containing gas while preferably controlling the amount of oxygen to prevent temperatures in substantial excess of 1000° F. The alkali metals used to form the catalyst of this invention are potassium, sodium, lithium, rubidium and cesium while the alkaline earth metals include strontium, magnesium, etc. Combinations of alkali metals and/or alkaline earth metals can be used. A preferred impregnant for the alumina has been found to be potassium bicarbonate. Salts of strong acids that do not decompose, for instance, sulfates and halides are unsatisfactory impregnants in that they produce catalysts unsuitable for the isomerization process of the present invention.

The alumina employed as the carrier or support in the anionic catalyst can be any of the variety of available alumina or alumina hydrates, such as alumina gel, activated alumina, gamma alumina, etc. Regarding purity of the alumina, it may be stated that small amounts of impurities are not generally detrimental. In fact, the commercially available alumina, Alcoa (F–1) which contains up to about 0.8 sodium as an impurity, is found to be a preferred support for the anionic catalyst of this invention with the sodium serving at least in part as the catalyst promoter. Alcoa (F–1) is an activated alumina whose typical properties are as follows:

Chemical analysis, percent:
  $Al_2O_3$ _____ 92
  $Na_2O$ _____ 0.80
  $Fe_2O_3$ _____ 0.12
  $SiO_2$ _____ 0.09
  Loss on Ignition 1100° C. _____ 6.8
Physical properties:
  Form _____ Granular
  Surface area, m.²/g. _____ 210
  Bulk density, packed, lb./ft.³ _____ 55
  Bulk density, loose, lb./ft.³ _____ 50
  Specific gravity _____ 3.3
  Dynamic sorption [1] _____ 13–15
  Crushing strength _____ 55
  Pore volume, ml./g. _____ 0.25
  Pore diameter, A. _____ 40
  Static adsorption at 60% (min.) _____ 13.0

[1] Adsorption of moisture at 100% efficiency from air under isothermal conditions at 30° C. and 90% relative humidity under dynamic flow of 7.5 ft.³/hr./lb.

Another very suitable alumina support is an activated alumina produced by spray drying an aqueous slurry of alumina hydrate containing trihydrate to form microspherical particles containing up to about 20 percent of free water. Another desirable alumina is that described in U.S. Patent No. 2,838,444 to Teter et al. Briefly, it is characterized by large pore, high area structure and is essentially composed of a mixture of gamma alumina modifications corresponding to a mixture of precursor alumina phases in which crystalline trihydrate predominate. The most suitable aluminas for use in the present invention are found to be those having a high surface area, for instance, alumina having a surface area of at least about 100 m.²/gm. The alumina may contain minor amounts of other components and the catalyst might contain metal promoters other than the alkaline metals.

Known methods for adding the metal component to the alumina support can be employed. A suitable method is to soak the alumina pellets or particles in an aqueous solution of the desired water-soluble alkali or alkaline earth metal compound and then convert the impregnating compound to the corresponding alkali or alkaline earth metal aluminae, for instance, by drying and calcining at temperatures above 600° F., e.g. up to 1200 or 1300° F. or more. The quantity of impregnating compound required is that which will produce a catalyst that is essentially basic. This quantity will ordinarily be about 0.4 to 8 milliequivalents of the alkali or alkaline earth metal compound, preferably about 1 to 7.5 milliequivalents per gram of alumina.

The following examples are included to further illustrate the invention. In the examples, activity of the catalyst is defined as the percent of thermodynamic equilibrium of 3-methylbutene-1 obtained in the product. The thermodynamic equilibrium is based on the three branched (methylbutenes) isomers, the normal pentenes being excluded. The selectivity values reported are conventional, namely, the moles of 3-methylbutene-1 obtained from 100 moles of isoamylenes consumed. The reaction pressure was slightly above atmospheric in all the examples below.

EXAMPLE I

A series of catalysts containing various milli-equivalents of potassium per gram of alumina were prepared as follows:

A C.P. grade potassium bicarbonate was dissolved in amounts of warm deionized water that give the indicated milliequivalents per gram of alumina on impregnation. Each potassium salt solution was then slowly poured on 100 grams of Alcoa's grade F–1 activated alumina while the latter was being stirred. The volume of solution and weight of alumina were proportioned to essentially fill the pores in the alumina without excess solution. The impregnated alumina was dried in a 110° C. oven with forced air circulation. Each composition was calcined for 16 hours at 1000° F.

Pure 2-methylbutene-2 was then passed over each catalyst at a WHSV of 3.3 and at various temperatures. The activity and selectivity of these catalysts are summarized in the following table.

*Table I*

|  | 0.521 meq. of K/g. of alumina | | |
| --- | --- | --- | --- |
| Activity | 1 | 32 | 75 |
| Selectivity | ------ | 95 | 99 |
| Temperature, °F | 600 | 800 | 900 |

|  | 1.93 meq. of K/g. of alumina | | |
| --- | --- | --- | --- |
| Activity | 99 | 104 | 99 |
| Selectivity | 98 | 96 | 65 |
| Temperature, °F | 800 | 900 | 1000 |

|  | 6.38 meq. of K/g. of alumina | | |
| --- | --- | --- | --- |
| Activity | 22 | 87 | 102 |
| Selectivity | 97 | 89 | 96 |
| Temperature, °F | 600 | 800 | 900 |

The results indicate that with this catalyst the rate of isomerization is slow at 600° F. but that it increases rapidly with increasing temperature. At 800° F. or higher, many of the catalysts have an activity of 100 or higher. The selectivity in most cases was above 95%, thus no substantial cracking or skeletal isomerization was observed.

In order to illustrate further the catalyst activity a series of experiments was run at various feed rates at 900° F. The catalyst used for these examples contained 1.93 meq. of potassium per gram of alumina. The results are as follows:

*Table II*

| Run No. | 7 | 8 | 9 |
| --- | --- | --- | --- |
| WHSV | 3.3 | 13.2 | 26.4 |
| Activity | 104 | 101 | 65 |

The selectivity was 98% (±2%) with essentially no cracking or skeletal isomerization being observed.

EXAMPLE II

At catalyst using Alumina "B" was prepared by the procedure of Example I. Alumina "B" is an activated relatively pure alumina characterized by large pore high area structure obtained by calcination of a mixture of precursor hydrous alumina phases in which crystalline trihydrate predominated. The area of the catalyst was greater than 100 square meters per gram. 2-methylbutene-2 was passed over the catalyst at a rate of 3.3 WHSV and at a temperature of 800° F. The activity of these catalysts was as follows:

*Table III*

| Run No. | 10 | 11 | 12 |
|---|---|---|---|
| Meq. of K/g. of alumina | 1.07 | 1.93 | 2.85 |
| Activity, percent | 48 | 104 | 103 |
| Selectivity, percent | 98±2 | 98±2 | 98±2 |

The results illustrate that active anionic catalysts can be prepared from a very pure form of alumina as well as the relatively impure grade of alumina used in Example I.

EXAMPLE III

The alumina of Example I was impregnated as in that example with a variety of potassium salts. The final catalysts each contained 1.35 meq. of potassium per gram of alumina. The reactions were run at 800° F. employing a WHSV of 3.3. The feed was the same (2-methylbutene-2) as in the above examples. The results were as follows:

*Table IV*

| Run No. | 13 | 14 | 15 | 16 | 17 | 18 |
|---|---|---|---|---|---|---|
| Salt | $KHCO_3$ | $K_2CO_3$ | KOH | $KNO_3$ | KCl | $K_2SO_4$ |
| Activity, percent | 93 | 97 | 93 | 98 | 2 | 5 |
| Selectivity, percent | 98±2 | 98±2 | 98±2 | 98±2 | 98±2 | 98±2 |

The results illustrate that excellent anionic catalyst can be prepared by impregnating the alumina with reagents that decompose during calcination. Also shown is the fact that stable salts such as KCl and $K_2SO_4$ that do not decompose during calcination do not make active catalysts.

EXAMPLE IV

A series of catalysts was prepared by impregnating the alumina of Example I with 1.35 and 0.52 meq. of strontium hydroxide and potassium hydroxide and with 1.35 meq. of sodium hydroxide. With respect to the catalysts impregnated with potassium and sodium salts, the impregnation was carried out in accordance with the procedure of Example I. The strontium hydroxide impregnation differed only in that acetic acid was needed to solubilize the strontium hydroxide. 2-methylbutene-2 was passed over the catalysts at a rate of 3.3 WHSV at a temperature of 800° F. The results were as follows:

*Table V*

| Run No. | 19 | 20 | 21 | 22 | 23 |
|---|---|---|---|---|---|
| Metal | Na | Sr | K | Sr | K |
| Meq. base/g. of alumina | 1.35 | 1.35 | 1.35 | 0.52 | 0.52 |
| Activity | 79 | 66 | 109 | 84 | 75 |
| Selectivity | 98±2 | 98±2 | 98±2 | 98±2 | 98±2 |

The results show that alkali metals other than potassium as well as alkaline earth metals can be used to make exceptionally good anionic isomerization catalysts. The three runs 19 through 21 show that potassium forms a much more active catalyst than the other metals. At lower concentrations of metal (0.52 meq./g. of alumina), however, strontium is more effective than potassium.

EXAMPLE V

In accordance with the procedure of Example I a catalyst was prepared by impregnating an Alumina "C" with $Cs_2CO_3$. Alumina "C" is an activated alumina produced by spray drying an aqueous slurry of alumina hydrate containing a minor amount of trihydrate to form microspherical particles containing up to about 20% of free water. The catalyst contained 1.92 meq. of base/g. of alumina. 2-methylbutene-2 was passed over this catalyst at a temperature of 700° F. and at a rate of 19.9 WHSV. The result was 63.3% isomerization to 3-methylbutene-1.

EXAMPLE VI

The alumina of Example V was impregnated with cesium carbonate so that the final catalyst contained 4.3 meq. of cesium/g. of alumina. 2-methylbutene-2 was passed over the catalyst at a temperature of 325° F. and a WHSV of 3.3. This catalyst gave the thermodynamic equilibrium for the three isomers, essentially no cracking or skeletal isomerization took place.

EXAMPLE VII

In this example a catalyst was prepared by impregnating the alumina of Example I with $Rb_2CO_3$. The catalyst contained 1.29 meq. of rubidium base/g. of alumina. 2-methylbutene-2 was passed over the catalyst at a temperature of 750° F. and at a rate of 19.9 WHSV. The catalyst gave 67.8% of thermodynamic equilibrium based on the 3-methybutene-1 content.

EXAMPLE VIII

A catalyst containing 1.92 meq. of K/g. of alumina prepared as in Example I was used for processing butene-1 at various temperatures and at a WHSV of 3.3 The following results were obtained:

*Table VI*

| Run No. | 24 | 25 | 26 |
|---|---|---|---|
| Temperature, °F | 700 | 800 | 900 |
| $C_4^=-1$ | 28.9 | 27.1 | 20.2 |
| trans $C_4^=-2$ | 34.9 | 41.6 | 40.3 |
| cis $C_4^=-2$ | 36.1 | 31.3 | 29.5 |
| $iC_4^=$ | 0 | 0 | 0 |

This example illustrates that n-butenes can be selectively isomerized by the catalysts of this invention at high temperature with essentially no cracking or skeletal isomerization.

EXAMPLE IX

Pure 2-methylpentene-1 was run over the catalyst of Example XIII. The reaction was run at 850° F. at a WHSV of 3.3 and with 2 moles of $N_2$/mole of olefin as a carrier gas. The following results were obtained.

*Table VII*

| Isomer: | Wt. percent |
|---|---|
| 2-Me-pentene-1 | 32.7 |
| 2-Me-pentene-2 | 53.3 |
| 4-Me-pentene-2 | 11.6 |
| 4-Me-pentene-1 | 2.4 |

The results show that hexenes can also be isoremized selectively by the catalyst of this invention without substantial cracking or skeletal isomerization. This example firmly demonstrates the unusual selectively afforded by the anionic catalyst of the present invention because hydrocarbons containing more than 4 carbons in the longest chain are more likely to undergo cracking or skeletal isomerization than those containing only four.

It is claimed:

1. A method for the selective carbon to carbon double bond isomerization without substantial cracking or skeletal isomerization of aliphatic monoolefin of 4 to 8 carbon atoms which comprises contacting said olefin under isomerization conditions at an elevated temperature of about 200–1100° F. and at an olefin partial pressure of 15 to 300 p.s.i.a. with an anionic catalyst prepared by calcining at a temperature of about 600 to 1300° F. a composition consisting essentially of alumina and about 1 to 7.6 milliequivalents per gram of said alumina of an alkali metal oxide, said oxide being sufficient to give an anionic catalyst.

2. The method of claim 1 wherein the alkali metal oxide is potassium oxide and the isomerization temperature is 600 to 1000° F.

3. The method of claim 1 wherein the olefin is an isoamylene selected from the group consisting of 2-methylbutene-1 and 2-methylbutene-2.

4. A method for the selective carbon to carbon double bond isomerization without substantial cracking or skeletal isomerization of aliphatic monoolefin of 4 to 8 carbon atoms which comprises contacting said olifin under isomerization conditions at an elevated temperature of about 200–1100° F. and at an olefin partial pressure of 15 to 300 p.s.i.a with an anionic catalyst prepared by calcining at a temperature of about 600–1300° F., a composition consisting essentially of alumina and about 1 to 7.6 milliequivalents per gram of said alumina of an alkali metal compound that decomposes to an alkali metal oxide upon said calcination said compound being sufficient to give an anionic catalyst.

5. The method of claim 4 wherein the compound selected is of potassium and the isomerization temperature is 600 to 1000° F.

6. The method of claim 4 wherein the olefin is an isoamylene selected from the group consisting of 2-methylbutene-1 and 2-methylbutene-2.

7. A method for the selective carbon to carbon double bond isomerization without substantial cracking or skeltal isomerization of aliphatic monoolefins of 4 to 8 carbon atoms which comprises contacting said olefin under vapor phase isomerization conditions at an elevated temperature of 200 to 900° F. and at an olefin partial pressure of at least 12 p.s.i.a. with an anionic catalyst prepared by calcining at a temperature of about 600 to 1300° F. composition consisting essentially of alumina and about 0.4 to 8 milliequivalents per gram of said alumina of a cesium compound selected from the group consisting of cesium oxides, and cesium compounds that decompose to a cesium oxide upon said calcination, said cesium compound being sufficient to give an anionic catalyst.

8. The method of claim 7 wherein the contacting is conducted at an olefin partial pressure of 15 to 300 p.s.i.a.

9. A method for the selective carbon to carbon double bond isomerization without substantial cracking or skeletal isomerization of aliphatic monoolefins of 4 to 8 carbon atoms which comprises contacting said olefin under vapor phases isomerization conditions at an elevated temperature of 200 to 900° F. and at an olefin partial pressure of at least 12 p.s.i.a. with an anionic catalyst prepared by calcining at a temperature of about 600 to 1300° F. a composition consisting essentially of alumina and about 0.4 to 8 milliequivalents per gram of said alumina of a rubidum compound selected from the group consisting of rubidium oxides, and rubiduim compounds that decompose upon said calcination, said rubidium compound being sufficient to give an anionic catalyst.

10. The method of claim 9 wherein the contacting is conducted at an olefin partial pressure of 15 to 300 p.s.i.a.

References Cited by the Examiner

UNITED STATES PATENTS

| | | | |
|---|---|---|---|
| 1,914,674 | 6/33 | Runge et al. | 260—683.2 |
| 2,330,071 | 9/43 | Mattox | 260—683.2 |
| 2,361,613 | 10/44 | Drennan | 260—683.2 |
| 2,377,352 | 6/45 | Mattox | 260—683.2 |
| 2,391,646 | 12/45 | Schulze et al. | 252—463 |
| 2,395,274 | 2/46 | Hillyer et al. | 260—683.2 |
| 2,474,440 | 6/49 | Smith et al. | 260—683.2 |
| 2,485,927 | 10/49 | Schulze et al. | 252—463 |
| 2,487,978 | 11/49 | Murray | 260—683.2 |
| 2,591,367 | 4/52 | McAllister | 260—683.2 |
| 2,952,719 | 9/60 | Appell | 260—683.2 |
| 2,965,689 | 12/60 | Roebuck et al. | 260—683.2 |

ALPHONSO D. SULLIVAN, *Primary Examiner.*

ALLAN M. BOETTCHER, *Examiner.*